Figure 1:
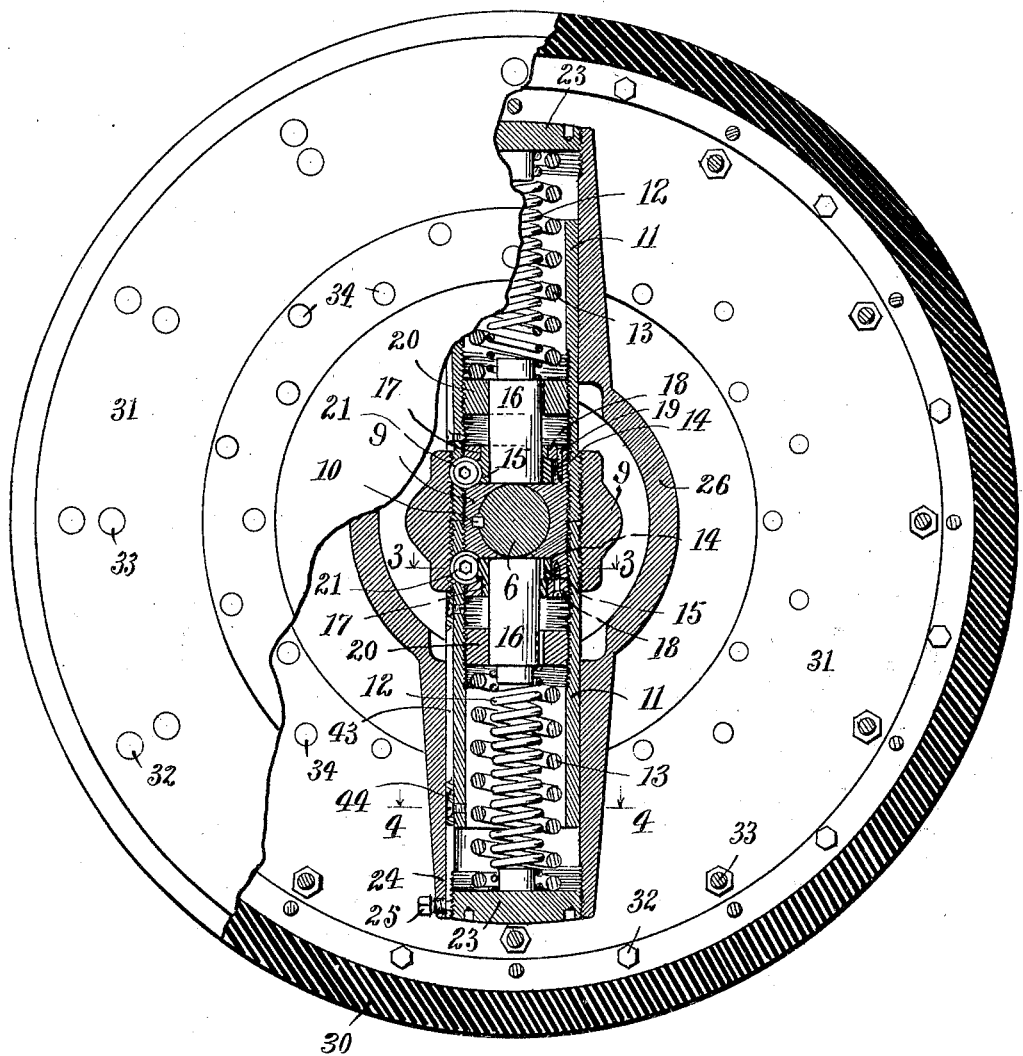

S. M. COWAN & E. W. BARNUM.
SPRING MOUNTED VEHICLE WHEEL.
APPLICATION FILED OCT. 25, 1911.

1,067,800.

Patented July 22, 1913.

2 SHEETS—SHEET 1.

Witnesses
Joan L. Morehouse
Ruth M. Worden

Inventors
Samuel M. Cowan
and Edward W. Barnum
By Chamberlain & Newman Attorneys S. M. COWAN & E. W. BARNUM.
SPRING MOUNTED VEHICLE WHEEL.
APPLICATION FILED OCT. 25, 1911.
1,067,800.
Patented July 22, 1913.
2 SHEETS—SHEET 2.
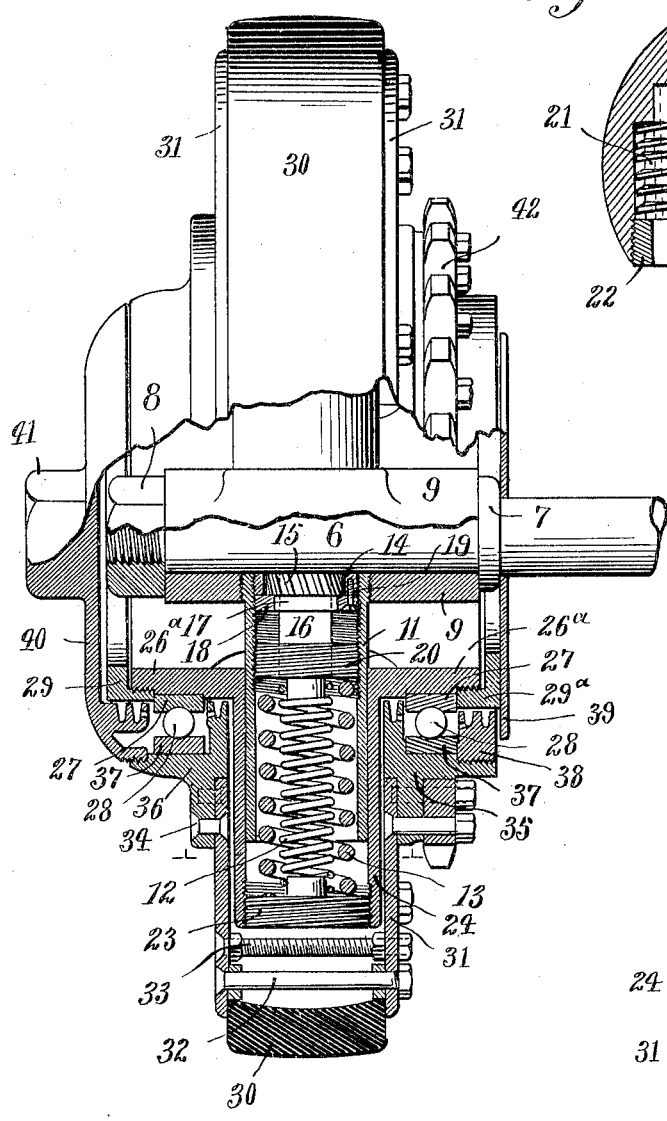
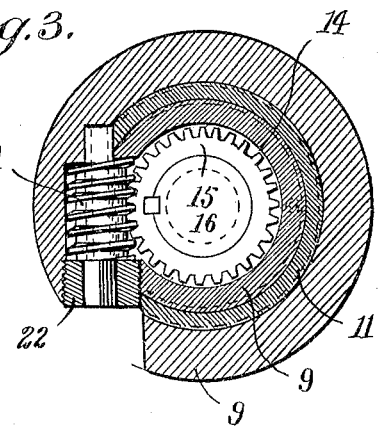
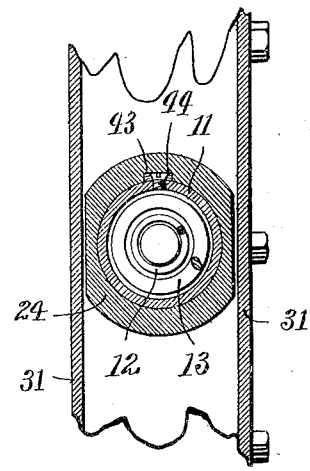
Witnesses
Joan L. Morehouse
Ruth M. Norden
Inventors
Samuel M. Cowan
and Edward W. Barnum
By Chamberlain & Newman Attorneys

UNITED STATES PATENT OFFICE.

SAMUEL M. COWAN, OF NEW YORK, N. Y., AND EDWARDS W. BARNUM, OF DANBURY, CONNECTICUT.

SPRING-MOUNTED VEHICLE-WHEEL.

1,067,800.    Specification of Letters Patent.    Patented July 22, 1913.

Application filed October 25, 1911. Serial No. 656,742.

*To all whom it may concern:*

Be it known that we, SAMUEL M. COWAN, of the city, county, and State of New York, and EDWARDS W. BARNUM, of Danbury, Fairfield county, Connecticut, citizens of the United States, and residents of said New York and Danbury, respectively, have invented certain new and useful Improvements in Spring-Mounted Vehicle-Wheels, of which the following is a specification.

This invention relates to wheels and particularly to resilient bearings or skeins for vehicles in which the hub or bearing member of the skein is arranged independently of the axle and so as to permit a movement relative to each other in a vertical plane, to be provided with a resilient element between said members to absorb the shocks and vibrations to which the outer or bearing member is subjected, the object of this arrangement being to substitute in place of the pneumatic tire treads commonly employed, a resilient device suitably inclosed so as to be free from the wear and liability of puncture to which the ordinary pneumatic tire is subject, and to provide means for adjusting the tension of such resilient device.

A further object of the present invention is to produce a wheel adapted for automobiles and automobile trucks that will successfully meet the requirements of a vehicle of this character; which will be comparatively simple in construction, strong and durable, with little possibility of the parts becoming disarranged, and adapted to permit the greatest possible resiliency and thereby absorb all shocks and jars to the body of the vehicle.

With these and other objects in view the invention consists in the construction and novel combination and arrangement of parts hereinafter fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification, and upon which, Figure 1 shows a sectional side elevation of our improved cushion wheel; Fig. 2 is a front elevation of the wheel shown in Fig. 1 and having part of its lower portion broken away and shown in section. Fig. 3 is an enlarged cross-section, looking down, and taken on line 3—3 of Fig. 1; and Fig. 4 shows a further cross-section, but taken on line 4—4 of Fig. 1.

Our improved wheel differs somewhat from other resilient or spring wheels in that the springs are not in the nature of spokes and do not turn with the wheel, but instead are carried in a hanger secured to the axle and having suitable non-rotatable bearings upon which the rotary portion of the wheel is mounted to turn. The device therefore includes a non-rotatable hub member upon which the body of the wheel rotates, and a cushioning device that is incorporated in the non-rotatable hub member, so that the axle is relieved from the jolts and jars caused by passing over such unevennesses in road as may be engaged. We employ two sets of these coil springs, one above and the other below the axle so as to directly carry the load thereof.

The mechanism of the wheel is entirely inclosed so as to eliminate any possibility of dirt getting into the wheel, and thus further serves to give the effect of being a solid wheel.

Referring in detail to the characters of reference marked upon the drawings 6 represents an axle which is provided with a collar 7 upon its inner end and a nut 8 upon its outer end. A sleeve 9 is secured to this shaft between the said collar and nut by means of a key 10 to hold the sleeve with the axle, against turning. The enlarged central portion of the sleeve is transversely bored and threaded to receive the threaded ends of the two directly opposed tubular casings 11—11. In practice these two casings are screwed into place in the member 9 before its longitudinal hole is bored therethrough. Therefore it will be obvious that a part of the opposite sides of the inner ends of the tubular casings are cut away to allow the axle to be inserted. In practice one of these casings is disposed up and the other down, directly above and below the axle. They each serve to partially inclose the coil springs 12 and 13 of which there are two in each casing. As before stated there are two of these spring devices which are exactly alike in construction, and therefore like reference characters will be used to indicate similar parts in the two sets of mechanisms. The sleeve 9 is recessed as at 14 to receive a worm gear 15 that is mounted upon a radially disposed stud 16. The hub 17 of said gear has its bearing in a collar 18 that threadably engages the internal thread of the inner end of casings and is further secured to the sleeve 9 by means of screws 19 passing therethrough and into the sleeve. A nut 20 is keyed to move upon the outer end of this stud 16 and has its peripheral face threaded to also engage the internal threads of the said tubular casing so that when the gear and stud are turned the nut will also be turned and by reason of its threaded engagement with the casing will also be adjusted in and out to regulate the tension of one of the springs 13. The gear 15 is operated by means of a worm 21 that is journaled transversely in a pocket of the sleeve 9 where it is inclosed by means of a nut 22. The inside of this shaft for this worm is squared to receive a key or wrench (not shown), by means of which the worm and gear are operated to adjust the tension of the larger spring 13. The inner end of the smaller spring 12 tightly abuts against the outer end of the said stud while the outer end of said spring similarly engages the inclosing cap 23 secured in the outer spring casing 24. The larger spring 13 is loosely seated between the said cap 23 and the before mentioned adjustable nut 20, while the smaller one is tight, being slightly compressed when inserted. This insures the smaller spring carrying the normal load of an empty vehicle and the larger spring serves to take care of the greater loads and jars and jolts carried by the engagement of the wheel with unusual obstructions. This cap 23 is screwed into the end of the cylindrical bores of the outer casings 24 and is locked in position by means of a set screw 25. The outer or female double ended casing members 24 are joined together by an intermediate cylindrical portion 26 that extends outward upon two sides to form bearings 26ª for the outer or rotary hub portion of the wheel. These casings are mounted upon the inner or tubular male members 11 and are made slidable thereon, a groove 43 being provided in the member 24 and a key 44 is secured to each of the members 11 so that the said outer member may be permitted to yield against the action of the springs and irrespective of any movement of the axle. The cylindrical portion 26ª surrounds the sleeve and is spaced therefrom, so as not to engage the axle and sleeve 9. Upon each of said bearings is mounted a hard steel bearing ring 27 that is grooved to receive the balls 28 for the formation of a ball bearing for the wheel. These bearing rings are held in place by end nuts 29 and 29ª that threadably engage the ends of said bearings 26ª.

The rotary wheel member is mounted to turn upon and around the foregoing construction and includes a suitable solid tire 30 that is held between the peripheral edge portions of the two side plates 31 of the wheel by bolts 32 and 33. To the inner edges of this side plate is secured by means of short bolts 34 an inner and outer hub 35 and 36 respectively. Each of these hubs is also provided with a hard steel bearing ring 37 which is arranged in line with the before mentioned rings 27 and are also grooved to accommodate the ball bearings 28 referred to, and whereby the rotary or outer operative member of the wheel is permitted to smoothly turn upon such inner hub member. The inner ring 37 is secured in place by means of an internal ring nut 38 which also serves to inclose the side of the pocket formed for the balls. The inner nut 29ª is provided with a flange 39 that extends out over a portion of the before mentioned internal nut 38 to close the joint and make the bearings dust proof. An inclosing cap 40 having a suitable shouldered head 41 for a wrench is threadably attached to the outer hub 36 as shown in Fig. 2 to entirely cover and inclose the outer ball bearings and connecting parts. A sprocket 42 can be secured to one side of the wheel as shown in Fig. 2, if desired, though this feature of course is optional.

From the foregoing it will be seen that the bearings 26ª and nuts 29 and 29ª are non-rotatable, but are suitably turned out and spaced from the axle and sleeve to allow ample movement of the said parts toward and from the shaft without striking the same. It will further be noted that this outer rotary wheel member is mounted to closely turn upon the inner hubs 35 and 36 which, together with the casings 24 and said wheel member is adapted to vibrate with respect to the axle and fixed sleeve member mounted thereon.

Having thus described our invention, what we claim and desire to secure by Letters Patent is:—

1. In a vehicle wheel, the combination of a fixed central member to receive an axle, and having extended tubular spring cases, a bearing member spaced from but supported upon the central member and bearing spring cases to register with those of the fixed member, a spring device within the said cases, and a nut, gear and worm for adjusting the tension of the said springs.

2. In a vehicle wheel, the combination of a sleeve adapted to receive an axle, and having extended fixed spring cases, a bearing member spaced from but supported upon the sleeve and having tubular casings slidably keyed to and telescoping the outer ends of the before mentioned cases, and spring devices within the said cases.

3. In a vehicle wheel, the combination of a fixed central member to receive an axle, of tubular spring cases extended upward and downward from the central member, a non-rotatable bearing member carried upon the central member and having cases slidable on and keyed to register with those of the central member, and a pair of springs arranged on each of the telescoping cases and between the central member and bearing member.

4. In a vehicle wheel, the combination of a fixed central member to engage an axle and having oppositely extended spring cases, a non-rotatable inner hub member having oppositely disposed spring cases to cover those of the central member, a pair of springs within the said casings, and means within the fixed central member for adjusting the tension of one of said springs.

5. In a vehicle wheel, the combination of a central member fixed to an axle and having extended tubular spring cases, a worm gear mounted therein, a stud upon which the gear is mounted, an adjustable nut upon the stud, a bearing member spaced from but supported upon the central member and having spring cases to register with those of the fixed member, a spring device within the said cases and bearing against the said adjustable nut, and means for operating the said gear and nut to adjust said springs.

Signed at New York city, N. Y., this 21st day of October, 1911.

SAMUEL M. COWAN.

Witnesses:
GEO. F. VAN VALKENBURGH,
ISAAC LINDE.

Signed at Danbury, Fairfield county, Connecticut, this 20 day of October, 1911.

EDWARDS W. BARNUM.

Witnesses:
JOHN M. BELDEN,
FRED D. MILLS.

---

Copies of this patent may be obtained for five cents each, by addressing the "Commissioner of Patents, Washington, D. C."